(12) United States Patent
Zametzky

(10) Patent No.: US 8,143,831 B2
(45) Date of Patent: Mar. 27, 2012

(54) REGULATING DEVICE FOR REGULATING THE VOLTAGE ON A HIGH-SIDE LOAD

(75) Inventor: Klaus Zametzky, Schwabach (DE)

(73) Assignee: Sitronic Ges. fuer elektrotechnische Ausruestung mbH & Co. KG, Gaertringen (DE)

( * ) Notice: Subject to any disclaimer, the term of this patent is extended or adjusted under 35 U.S.C. 154(b) by 742 days.

(21) Appl. No.: 12/225,979

(22) PCT Filed: Feb. 14, 2007

(86) PCT No.: PCT/DE2007/000269
§ 371 (c)(1),
(2), (4) Date: Nov. 20, 2008

(87) PCT Pub. No.: WO2007/112713
PCT Pub. Date: Oct. 11, 2007

(65) Prior Publication Data
US 2009/0310948 A1 Dec. 17, 2009

(30) Foreign Application Priority Data
Apr. 5, 2006 (DE) .......................... 10 2006 016 338

(51) Int. Cl.
*H02P 7/00* (2006.01)
(52) U.S. Cl. ...................... 318/434; 318/400.3; 318/599
(58) Field of Classification Search .................. 318/139, 318/599, 400.01, 400.06, 400.3, 504, 812, 318/434; 324/416; 314/115; 315/287; 123/623; 363/21.1, 21.18, 26, 41, 74, 60; 81/469
See application file for complete search history.

(56) References Cited

U.S. PATENT DOCUMENTS

| | | | |
|---|---|---|---|
| 4,232,261 A | 11/1980 | Lingstaedt et al. | |
| 4,622,499 A * | 11/1986 | Squires et al. | 318/400.04 |
| 5,942,866 A * | 8/1999 | Hsieh | 318/268 |
| 6,803,672 B2 * | 10/2004 | Gunasekera | 307/9.1 |

(Continued)

FOREIGN PATENT DOCUMENTS

DE 69403965 T2 6/1997

(Continued)

OTHER PUBLICATIONS

Halbleiterschaltungstechnik, Springer-Verlag, 10. Auflage, 1993. S. 549-550.

*Primary Examiner* — Bentsu Ro
*Assistant Examiner* — Antony M Paul
(74) *Attorney, Agent, or Firm* — Walter A. Hackler

(57) ABSTRACT

The invention to an electronic control system, controlled by a pulse width-modulated signal (SG) related to earth, for regulating the voltage (Umot) across a high-side load (M), in particular a fan control unit for motor vehicles. The circuit part that converts the pulse width-modulated signal (SG) into the reference input variable (U−) needed for the regulation uses the positive potential of the supply voltage (V2) as reference potential, so that the reference input variable (U−) is likewise related to the positive potential of the supply voltage and the control signal (SG) is converted by means of a Zener diode (D1) and by means of a resistor (R5) connected parallel to the Zener diode (D1) into a control signal related to the positive supply potential and is further converted with a low pass filter (R7, C1) into a linear control signal, which serves as input reference variable (U−).

5 Claims, 2 Drawing Sheets

U.S. PATENT DOCUMENTS

| | | | |
|---|---|---|---|
| 7,088,062 B2 * | 8/2006 | Makaran | 318/34 |
| 7,542,251 B2 * | 6/2009 | Ivankovic | 361/23 |

FOREIGN PATENT DOCUMENTS

| | | |
|---|---|---|
| EP | 0703667 A1 | 9/1994 |
| EP | 1 422 819 A1 | 5/2004 |
| JP | 09215321 | 0/1997 |
| JP | 58-107921 A | 6/1983 |
| JP | 01302409 | 12/1989 |

* cited by examiner

REGULATING DEVICE FOR REGULATING THE VOLTAGE ON A HIGH-SIDE LOAD

The invention relates to an electronic regulating system, controlled by a pulse width-modulated signal, for regulating the voltage across a high-side load, in particular a fan regulator for motor vehicles.

Such regulating systems are generally well known through their use in motor vehicles.

Japanese Patent JP 01302409 AA discloses an electronic regulating system for regulating the voltage, having a reference input variable related to the positive potential of the supply voltage for the regulation.

Japanese Patent JP 09215321 AA discloses a regulating system having a circuit part that converts the pulse width-modulated signal into the reference input variable needed for the regulation. The earth is used here as a reference potential.

An important basic function of the regulating system is the regulation of the motor voltage as a function of a control signal. This control signal may be an analogue control voltage, an analogue control current or a digital signal. Control systems for fans according to the teaching of the prior art internally convert control currents and digital control signals into a control voltage, so that in principle a closed loop circuit that regulates the motor voltage as function of a control voltage is always present. If the control signal is a digital control signal, then a device that generates an analogue control voltage from the digital control signal is provided. The analogue control voltage is clearly functionally linked to the digital control signal. Generally speaking, the digital control signal is a PWM signal, in which the desired setpoint is encoded in the pulse duty cycle between active and inactive control signal.

Known linear control systems for fans having a digital control signal generally use the circuit topology illustrated in FIG. 3. A vehicle battery V2 provides the current supply for the arrangement as a whole. The linear control system is connected to the output of a control unit, via which the digital control signal S1 is transmitted. In the control unit, this signal is normally generated with a transistor, which in the active state connects the signal to earth and in the inactive state leaves the line open. The magnitude of the desired value of the motor voltage is generally encoded in the pulse duty cycle comprising active and inactive state of the control signal. A control voltage V1 proportional to the setpoint can be generated from this pulse width-modulated signal, for example, by low pass filtering. An operational amplifier U1A adjusts its output voltage and hence the gate-source voltage of the MOS transistor M1 in such a way that U+ becomes approximately equal to U−. The arrangement can be described by corresponding equations. If R8/R9=R10/R11 is selected, then the correlation between control voltage V1 and motor voltage $U_{mot}$ is as follows:

$$U_{mot} = V1*(R9/R8)$$

An important requirement of a control system for a fan is the smoothing out of on-board voltage fluctuations. $U_{mot}$ should be independent of V2. This applies only when R8/R9=R10/R11 exactly. Upon occurrence of on-board voltage fluctuations dV2, the response of the control system according to FIG. 3 is therefore dependent on the pairing tolerance of the voltage dividers R8/R9 and R10/R11.

The correlation $U_{mot}=f(V1)$, assuming ideal components and ideal pairing tolerances of R8/R9=R10/R11, is determined only by the resistance ratio of R8/R9. $U_{mot}$ is largely independent of V2. The operational amplifier smooths out onboard voltage fluctuations.

In standby operation, V1=0. The current consumption Ib of the arrangement is in this case called the quiescent current and should be as low as possible in order not to discharge the battery.

If V1=0, $U_{mot}$=0, and hence also Id=0 (modern MOSFETs have very small off-state currents). Accordingly, Ib=I1+I2+I3. I3 can be maintained at a very low level by the use of an ultra low power op-amp.

If, for reasons of cost, it is desired to dispense with an encapsulation of the regulator electronics, then the use of high-impedance resistors is problematic. Condensation and the contaminations associated therewith on the circuit board surface that occur in the vehicle lead to leakage currents, which affect the function of switching circuits designed with high impedance. R8 to R11 cannot therefore be made with arbitrarily high impedance. I1 and I2 thus put no load on the battery in standby operation.

SUMMARY OF THE INVENTION

The invention addresses the problem of improving the regulation.

The invention enables a control system, in particular for a fan, to be constructed with comparatively few discrete components. The control system is distinguished by a good control response and an extremely small quiescent current consumption.

BRIEF DESCRIPTION OF THE DRAWINGS

Two preferred exemplary embodiments of the invention are illustrated diagrammatically in the drawings and are explained below by means of the Figures in the drawings, in which.

DETAILED DESCRIPTION

Figure 1:
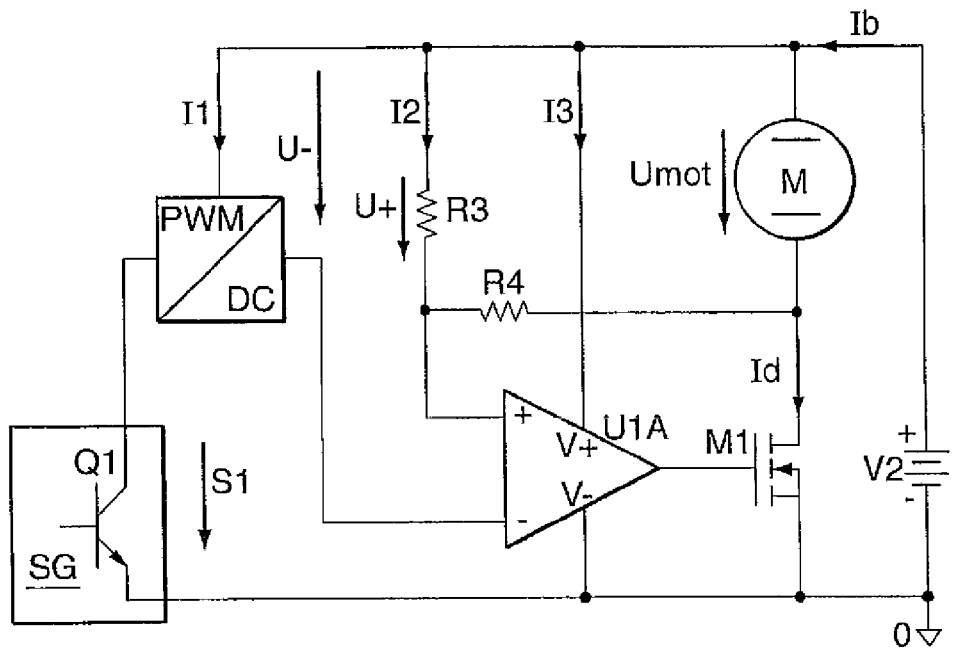
FIG. 1 is a circuit diagram of a first inventive control system.

According to FIG. 1, the pulse width-modulated control signal S1 of a control unit SG of an air-conditioning system is used to generate a control voltage U−, which relates firstly to the positive supply voltage V2 and the magnitude of which is clearly functionally linked to the duty factor of the control signal S1.

In the preferred embodiment, the pulse width-modulated control signal S1 is related to earth.

The two input voltages of the regulator U1A are related to the positive supply voltage V2. So according to the circuit diagram of FIG. 1, $U_{mot}$ is $$U_{mot} = U_{-} \cdot \left(1 + \frac{R_4}{R_3}\right)$$

and so independent of V2.

In contrast to FIG. 1, resistance tolerance pairings are not taken into account in the relation $dU_{mot}=f(dV2)$.

According to the teaching of the invention, on-board voltage fluctuations are therefore smoothed out in an improved manner.

The regulator U1A recognises when the output signal of the PWM/DC inverter, i.e. U, falls below a specific threshold value and in that case transfers itself and the downstream transistor M1 into a zero-current state of rest. Then $I_2$ becomes approximately equal to 0, $I_3$ becomes approximately equal to 0, $I_d$ becomes approximately equal to 0, and hence $I_b$ becomes approximately equal to 0. The circuit therefore has an extremely small current consumption when the transistor Q1 of the control unit is permanently blocked.

Even when of low-impedance design, I2 and I3 put no load on the battery V2 in idle operation.

Figure 2:
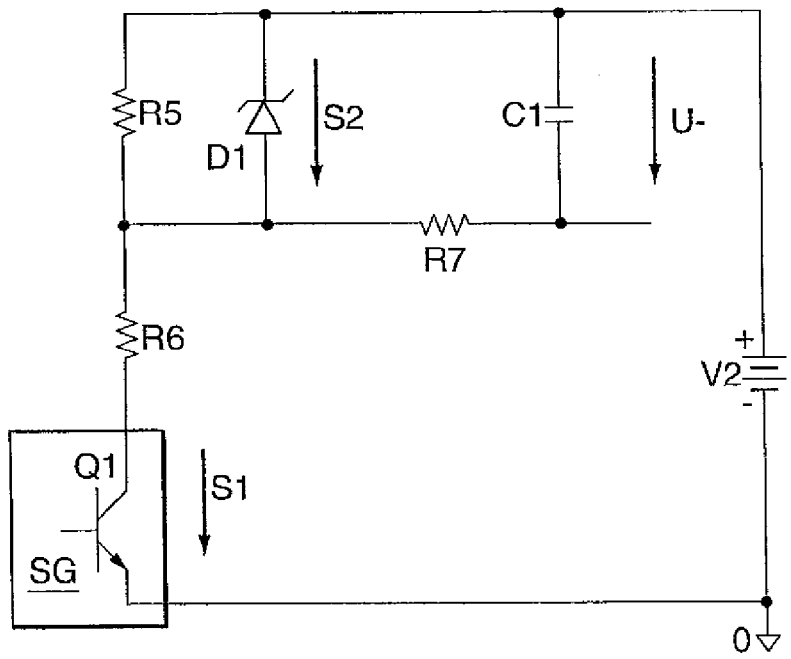
FIG. 2 is a circuit diagram of a second inventive control system.
Figure 3:
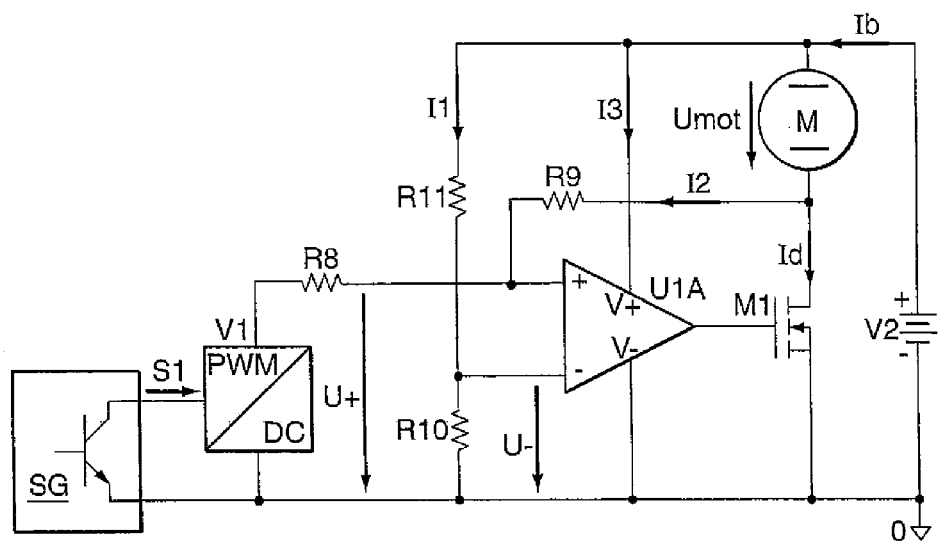
FIG. 3 is a circuit diagram of a known control system.

In a further embodiment according to FIG. 2, the control signal S1, which is related to earth, is converted by the voltage divider R5/R6 and the Zener diode D1 into a pulse width-modulated signal S2 related to the positive supply voltage. This signal is converted with a low pass filter R7/C1 into a linear control a voltage U−, which in good approximation is proportional to the duty factor of the control signal S1. The device is currentless when the transistor Q1 is permanently switched off, and satisfies the requirement for low quiescent current consumption without additional circuit complexity.

What is claimed is:

1. Electronic control system, controlled by a pulse width-modulated signal (SG) related to earth, for regulating the voltage (Umot) across a high-side load (M), in particular a fan control unit for motor vehicles, wherein the circuit part that converts the pulse width-modulated signal (S1) into the reference input variable (U−) needed for the regulation uses the positive potential of the supply voltage (V2) as reference potential, so that the reference input variable (U−) is likewise related to the positive potential of the supply voltage and the control signal (S1) is converted by means of a Zener diode (D1) and by means of a resistance (R5) connected parallel to the Zener diode (D1) into a control signal related to the positive supply potential and is further converted with a low pass filter (R7, C1) into a linear control signal, which serves as input reference variable (U−).

2. Control system according to claim 1, characterised in that the input voltages supplied to the regulator (U1A) are related to the positive supply potential from which the load is fed.

3. Control system according to claim 1, characterised in that the regulation of the load voltage during supply voltage fluctuations is independent of a resistance pairing.

4. Control system according to claim 1, characterised in that the regulator (U1A) recognises when the output voltage of the PWM/DC-inverter falls below a threshold value, and in that case transfers itself and the downstream transistor (M1) into a zero-current state of rest.

5. Control system according to claim 1, characterised in that the arrangement has a quiescent current consumption independent of the dimensioning of the resistors (R3, R4).

* * * * *